United States Patent
Altman

(10) Patent No.: US 11,500,790 B1
(45) Date of Patent: Nov. 15, 2022

(54) SYSTEMS AND METHODS FOR FAST ROUND ROBIN FOR WIDE MASTERS

(71) Applicant: Marvell Asia Pte, Ltd., Singapore (SG)

(72) Inventor: Yehoshua Altman, Avnei Hefetzh (IL)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/387,486

(22) Filed: Jul. 28, 2021

Related U.S. Application Data

(60) Provisional application No. 63/057,750, filed on Jul. 28, 2020.

(51) Int. Cl.
*G06F 13/00* (2006.01)
*G06F 13/16* (2006.01)
*G06F 1/08* (2006.01)
*G06F 13/37* (2006.01)

(52) U.S. Cl.
CPC ............ *G06F 13/1631* (2013.01); *G06F 1/08* (2013.01); *G06F 13/1668* (2013.01); *G06F 13/37* (2013.01)

(58) Field of Classification Search
CPC .. G06F 13/1631; G06F 13/1668; G06F 13/37; G06F 13/00; G06F 12/00; G06F 1/08
See application file for complete search history.

(56) References Cited

U.S. PATENT DOCUMENTS

| | | | | |
|---|---|---|---|---|
| 5,936,953 A | * | 8/1999 | Simmons | G06F 13/4018 370/257 |
| 6,199,181 B1 | * | 3/2001 | Rechef | H04L 63/0263 726/26 |
| 7,567,587 B1 | * | 7/2009 | Mlazgar | H04J 3/08 370/474 |
| 2012/0117288 A1 | * | 5/2012 | Katogi | G06F 13/364 710/114 |

* cited by examiner

*Primary Examiner* — Tuan V Thai

(57) ABSTRACT

A master request comprising a plurality of bits is received, each bit representing whether a host device of a plurality of host devices has issued a memory access request. The master request is divided into a plurality of slices, each respective slice containing a subset of the plurality of bits corresponding a subset of host devices. Based on the respective subsets of the plurality of bits, it is determined whether each respective slice contains at least one memory access request. A first round robin process then begins in which it is determined whether each respective slice contains a memory access request. If so, any memory access request contained in the respective slice are processed via a second round robin process before proceeding to process memory access requests of another slice. If the respective slice contains no memory access requests, processing skips to a next slice without processing the respective slice.

14 Claims, 7 Drawing Sheets

SYSTEMS AND METHODS FOR FAST ROUND ROBIN FOR WIDE MASTERS

CROSS-REFERENCE TO RELATED APPLICATION

This disclosure claims the benefit under 35 U.S.C. 119(e) of commonly-assigned U.S. Provisional Patent Application No. 63/057,750, filed Jul. 28, 2020, which is hereby incorporated by reference herein in its entirety.

FIELD OF USE

This disclosure relates to processing, by a memory controller, memory access requests from a large number of host devices.

BACKGROUND

The background description provided herein is for the purpose of generally presenting the context of the disclosure. Work of the inventors hereof, to the extent that the work is described in this background section, as well as aspects of the description that does not otherwise qualify as prior art at the time of filing, are neither expressly nor impliedly admitted to be prior art against the present disclosure.

Typical systems for processing memory access requests from multiple host devices employ a round robin process. Round robin processes take requests from each host device in turn, spending equal amounts of time serving each host device. These systems typically read or receive incoming signals from each individual host device, regardless of whether an actual memory access request is being made by each host device. This results in processor time being wasted on serving a host device that has not made any request. Additionally, in systems with extremely large numbers of host devices, it can be difficult to design efficient systems for handling memory access request.

SUMMARY

Implementations described herein provide an apparatus and method for managing memory access requests from a plurality of host devices. A master request comprising a plurality of bits is received, each bit representing whether a host device of a plurality of host devices has issued a memory access request. The master request is divided into a plurality of slices, each respective slice containing a subset of the plurality of bits corresponding to a subset of host devices of the plurality of host devices. Based on the respective subsets of the plurality of bits, it is determined whether each respective slice contains at least one memory access request. A first round robin process then begins in which, for each respective slice, it is determined whether the respective slice contains a memory access request. If so, any memory access request contained in the respective slice are processed via a second round robin process before proceeding to process memory access requests of another slice. If the respective slice contains no memory access requests, processing skips to a next slice without processing the respective slice.

In some embodiments, an indication is generated, for each respective slice, indicating whether the respective slice contains a memory access request. The determination of whether the respective slice contains a memory access request may then be based on the indication for the respective slice. The indication may be generated by performing a bitwise OR operation to identify whether the respective slice contains a memory access request. Each slice may contain the same number of bits representing a number of host devices. The bitwise OR operation may then compare a bit pattern of all host devices represented by the respective slice.

In some embodiments, to skip to a next slice, a subsequent slice containing at least one memory access request is identified, based on an indication in a current slice. Although each slice is normally processed sequentially in the first round robin process, the identified slice is accessed without accessing any intervening slices such that the first round robin process moves directly from the current slice to the identified slice. Identification of the subsequent slice may be accomplished by retrieving a configurable value and identifying a subsequent slice based on the configurable value.

In some embodiments, skipping to the next slice without processing the respective slice occurs within a single clock cycle such that no clock cycle is spent processing the respective slice that does not contain a memory access request.

BRIEF DESCRIPTION OF THE DRAWINGS

Further features of the subject matter of this disclosure, its nature, and various advantages will become apparent upon considerations of the following detailed description, taken in conjunction with the accompanying drawings, in which like reference characters refer to like parts throughout, and in which.

DETAILED DESCRIPTION

Implementations described herein provide an apparatus and method for managing memory access requests from a plurality of host devices in a distributed memory system. The plurality of host devices may be computing devices (e.g., personal computers, servers, smartphones, tables, etc.) or may be different components within a single computing device (e.g., RAM, local storage controller, local hard drive and/or SSD, etc.). Each host device may issue a number of memory access requests. For example, each host device may comprise several components that each require access to memory. As each component of each host device requests memory access, the requests are queued such that they are served in the order in which they are issued. Requests originating from each respective host device are grouped together into a master request for processing by a memory access controller.

As used herein, the term "master" or "master request" means a single unit of data (e.g., a packet) containing memory access requests from multiple host devices. In some implementations, a master request contains memory access requests from every host device. For example, in an embodiment, host devices request to access data stored in one or more storage devices in a distributed memory system. In some cases, even when no memory access request is made by a host device, empty requests are still included in the master request. In such cases, processing time may be wasted on these empty requests.

Figure 1:
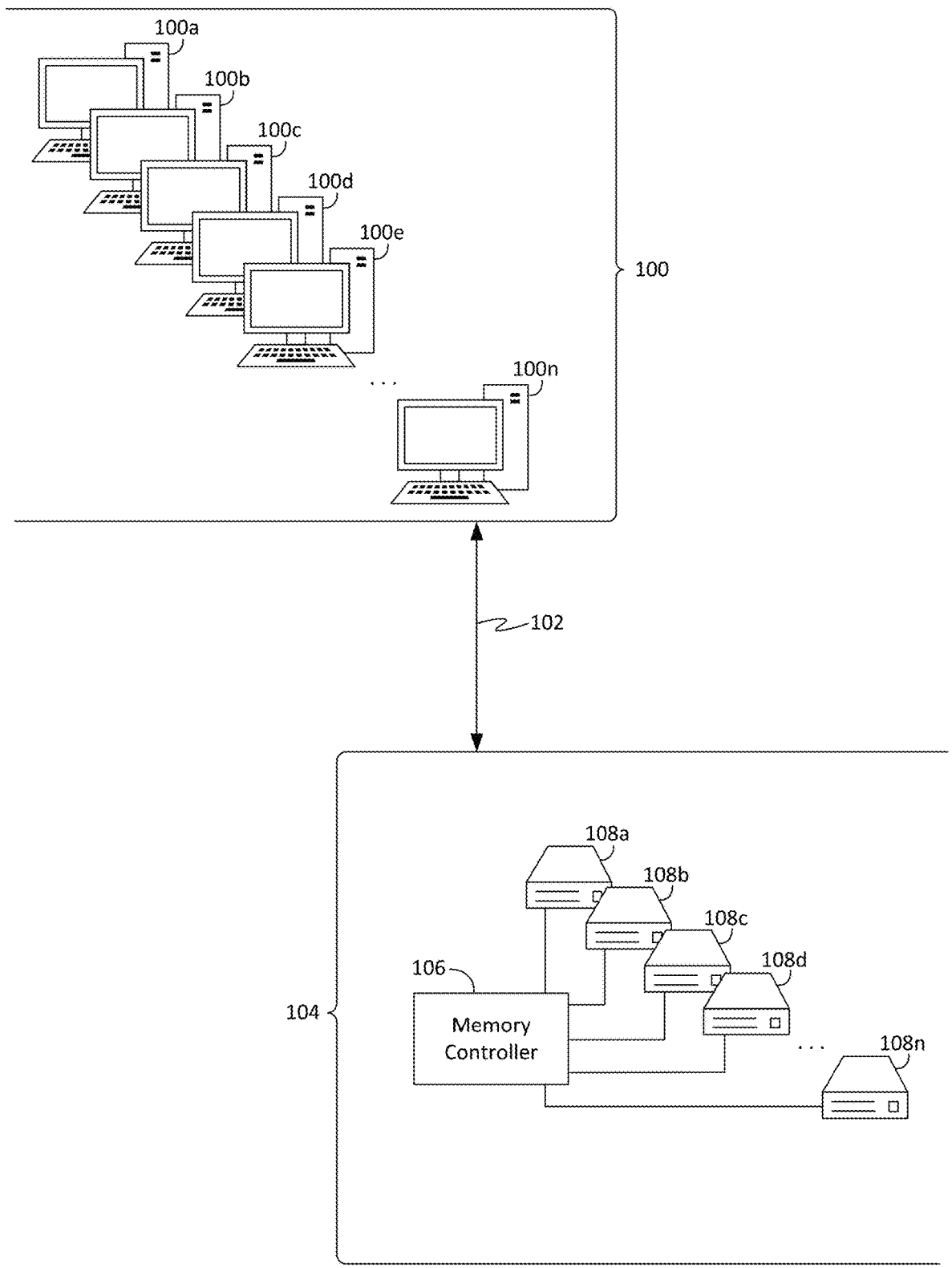
FIG. 1 is a diagram illustrating a distributed memory system which receives memory access requests from a plurality of host devices in accordance with some implementations of the subject matter of this disclosure.

FIG. 1 is a diagram illustrating a plurality of host a distributed memory system which receives memory access requests from a plurality of host devices in accordance with some implementations of the subject matter of this disclosure. Host devices 100, including computing devices 100a-100n in the example of FIG. 1, communicate over link 102, with a distributed memory system 104. Link 102 may be a non-volatile memory express (NVMe) interface, or any suitable fabric over which host devices 100 can communicate memory access requests to distributed memory system 104. One or more components of host devices 100 or, alternatively, a component through which each of host devices 100a-100n connects to link 102, generates a master request indicating, for each host device, whether a memory access request have been issued. This indication is achieved by assigning the value in the master request corresponding to a given host device to "1" if the host device issued a memory access request, or to "0" in the host device did not issue a memory access request. Distributed memory system 104 comprises memory controller 106 which processes memory access requests received from host devices 100 based on the master request.

Memory controller 106 splits the master request into slices of equal size, each slice representing the same number of host devices. For example, in a system of 1024 host devices, the master request comprises 1024 bits, each bit representing a single host device. Based on the architecture of the memory controller, the supported size of a slice may be 16 bits. Thus, the master request is divided every 16 bits to create 64 slices, each slice representing 16 host devices. Memory controller 106 determines, using a bitwise OR operation, whether any of the host devices represented by a given slice have issued a memory access request. For example, in a 16-bit slice, each bit represents a single host device. If a host device has issued a memory access request, its corresponding bit value in the slice will be a "1" and if not, its corresponding bit value will be a "0". Thus, a bitwise OR comparison of the values in a slice will result in a "1" if any host device representing in the slice has issued a memory access request.

Memory access controller 106 steps through each slice in a round robin processes and serves memory access requests from each host in each respective slice, for example, retrieving data from, or writing data to, one or more of storage devices 108a-108n. However, if the bitwise OR result for a given slice is "0" then memory controller 106 will skip processing of that slice and move directly to the next slice whose bitwise OR result is a "1".

Figure 2:
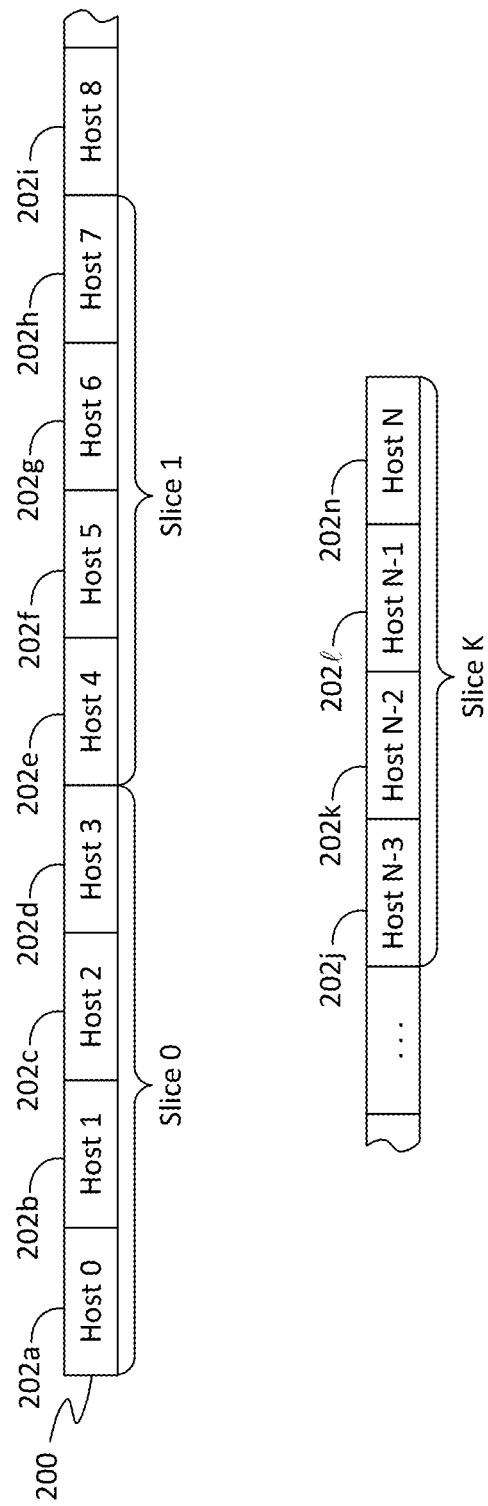
FIG. 2 is a diagram illustrating the structure and content of a master request in accordance with some implementations of the subject matter of this disclosure.

FIG. 2 is a diagram illustrating the structure and content of a master request 200 in accordance with some implementations of the subject matter of this disclosure. Master request 200 contains memory access requests 202a-202n from a number of host devices 100a-100n. Memory access requests from each respective host are grouped together, in an embodiment, into segments or slices before being transmitted (e.g., over an NVMe link) to a distributed memory system. For example, an NVMe controller may poll each host device and receive, in response, a set of memory access requests from each host device. The master request is then assembled with one bit representing each host device, with a "1" representing a host device from which at least one memory access request was received and a "0" representing a host device from which no memory access requests were received. Thus, whether or not any memory access request was issued by Host 0 is represented by bit 202a while issuance of memory access requests by Host 1 is represented by bit 202b. Master request 200 is split at regular intervals to create slices, each slice representing the same number of host devices. The memory controller (e.g., memory controller 106) can complete a single round robin faster by determining whether each slice represents any host device that has issued a memory access request. Slices representing only host devices that have not issued any memory access requests can be skipped, and no processing time needs to be allocated to serving the host devices represented by the skipped slice. Slices which represent only host devices that have not issued any memory access requests may be referred to herein as "empty" slices. Slices which represent at least one host device that has issued at least one memory access request may be referred to herein as "non-empty" or "full" slices.

Figure 3:
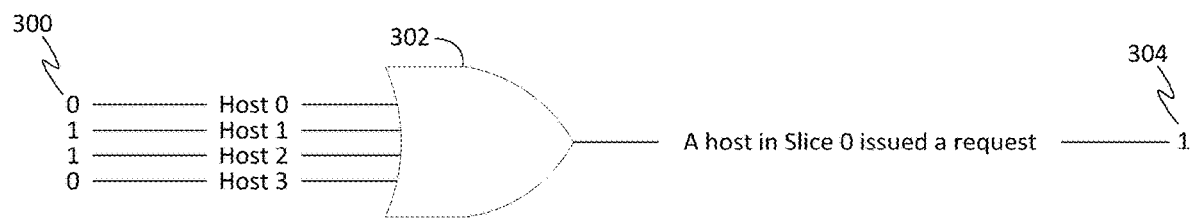
FIG. 3 is a diagram illustrating circuitry for performing a bitwise OR operation performed in accordance with some implementations of the subject matter of this disclosure.
Figure 4:
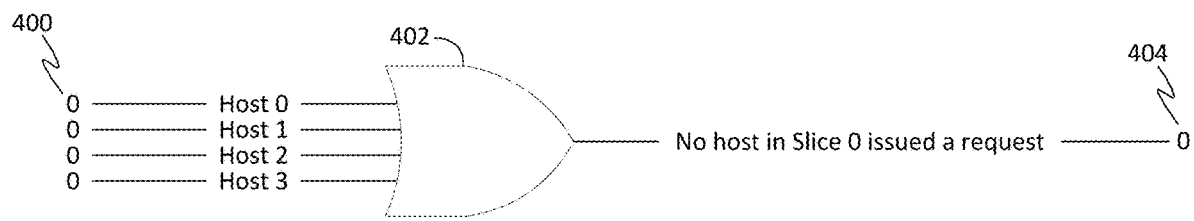
FIG. 4 is another diagram illustrating circuitry for performing a bitwise OR operation performed in accordance with some implementations of the subject matter of this disclosure.

To determine whether any of the hosts represented in a given slice has issued a memory access request, a bitwise OR operation is performed whereby each bit of the slice is compared together. FIG. 3 is a diagram illustrating an example circuitry for performing a bitwise OR operation performed on a slice representing four host devices, only two of which have issued memory access requests. Bits 300 of the slice are compared by OR circuitry 302. Since at least one host device represented by the slice has issued a memory access request, result 304 of the bitwise OR operation in "1". FIG. 4 is a similar diagram illustrating circuitry for performing a bitwise OR operation performed on a slice representing four host devices, of which none have issued a memory access request. Bits 400 are compared sing OR circuitry 402, and result 404 is generated. Because all bits of the slice are "0", result 404 is also "0".

Figure 5:
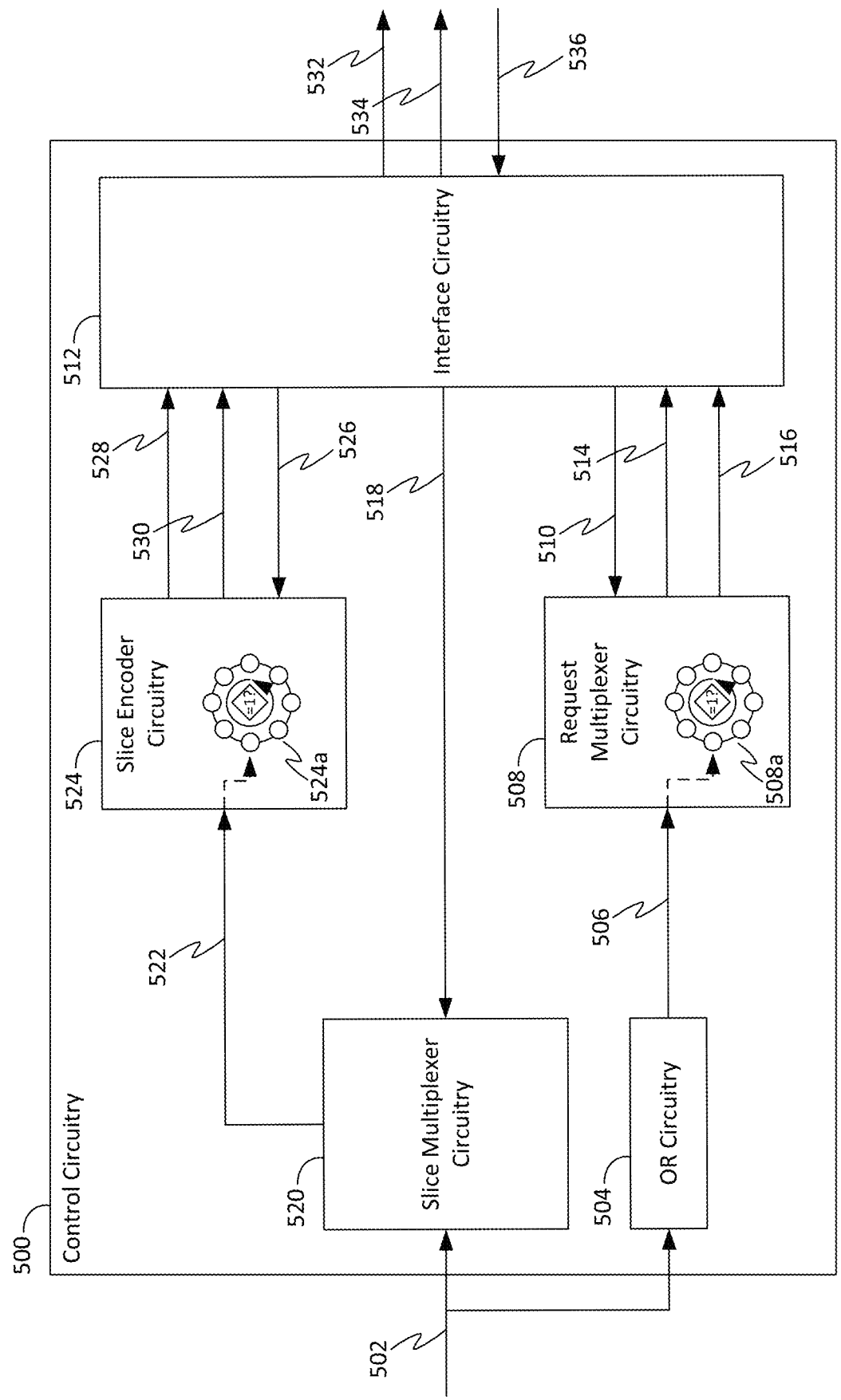
FIG. 5 is a block diagram illustrating components and data flow therebetween of an apparatus for managing memory access requests from a plurality of host devices using nested round robin selection of the next request to be served in accordance with some implementations of the subject matter of this disclosure.

FIG. 5 is a block diagram illustrating components and data flow therebetween of an apparatus for managing memory access requests from a plurality of host devices in accordance with some implementations of the subject matter of this disclosure. Control circuitry 500 (e.g., memory controller 106) receives, at 502, a master request (e.g., master request 200). Both OR circuitry 504 and slice multiplexer circuitry 520 receive the master request. In an embodiment, OR circuitry 504 splits the master request into a plurality of slices. In some embodiments, other components, such as slice multiplexer circuitry 520, may be responsible for splitting the master request into a plurality of slices. For example, in an embodiment, a 1024-bit master request representing 1024 host devices may be split into 64 slices, each slice containing 16 bits of data. OR circuitry 504 performs a bitwise OR operation on each slice, as discussed above in connection with FIGS. 3 and 4. OR circuitry 504 generates a result value having a number of bits equal to the total number of slices and assign to each bit a valve of "1" if the corresponding slice represents at least one host device that has issued at least one memory access request, or a value of "0" if the corresponding slice does not represent any host devices that have issued a memory access request. For example, for a 1024-bit master request split into 64 slices, OR circuitry 504 generates a 64-bit value. OR circuitry 504 determines, for each slice, based on the results of the bitwise OR operation, whether the respective slice represents any host devices that have issued any memory access requests. If so, OR circuitry 504 sets the corresponding bit in the result value to "1".

The resulting value generated by OR circuitry 504 is transmitted, at 506, to request multiplexer circuitry 508. Request multiplexer circuitry 508 performs a round robin process 508a in selecting slices to be processed. If other slices have previously been processed, request multiplexer circuitry 508 also receives, at 510, from interface circuitry 512, an index of the current slice to be processed. Interface circuitry 512 may be a remote direct memory access (RDMA) interface or may by any other suitable type of memory access interface using any suitable memory access protocols. Request multiplexer circuitry 508 determines whether the bit of the results value corresponding to the received index is a "1" or a "0". If the bit is a "0" then the current slice to be processed is empty and request multiplexer circuitry 508 identifies the next slice that is not empty by determining the next bit in the results value that is a "1". For example, request multiplexer circuitry 508 may check each bit of the results value, beginning with the least significant bit, until a "1" is found. Request multiplexer circuitry 508 identifies an index corresponding to the detected non-empty slice. For example, the position at which the "1" was found within the results value may be the index used to identify the corresponding slice.

Once the next non-empty slice is identified, request multiplexer circuitry 508 transmits to interface circuitry 512, at 514, a flag indicating that a valid, or non-empty, slice has been identified. Request multiplexer circuitry 508 also transmits to interface circuitry 512, at 516, the index of the identified slice. interface circuitry 512 updates the index value of the current slice to be processed to that of the received index of the identified slice and transmits, at 518, the updated index value to slice multiplexer circuitry 520. Slice multiplexer circuitry 520 then selects the corresponding slice. For example, for 16-bit slices, slice multiplexer selects 16 bits starting from 16 times the index value of the current slice to be processed. Slice multiplexer circuitry 520 then transmits, at 522, the selected slice to slice encoder circuitry 524.

In some embodiments, transmissions at 510 and 518 may be made over the same physical bus. Additional logic or signaling may be employed to direct transmissions on the bus to the appropriate component. Alternatively or additionally, signaling may be employed by each component to allow or prevent receipt of transmissions on the bus. Slice multiplexer circuitry 520 uses the index transmitted at 518 to select the current slice to provide to slice encoder circuitry 524, while request multiplexer circuitry 508 uses the index transmitted at 510 to search for the next valid (i.e., non-empty) slice.

Slice encoder circuitry 524 performs a round robin process 524a on the received slice to serve each memory access request contained in the slice. Slice encoder circuitry 524 receives, from interface circuitry 512, at 526, an index of the next request to be processed. Similar to the process 508a performed by request multiplexer circuitry 508 in selecting a slice, slice encoder circuitry 524 identifies the next host represented in the current slice that has issued a memory access request. For instance, in an example, the bit values of the selected slice may be "00110100" where a "0" indicates a host that has not issued any memory access requests and a "1" represents a host that has issued at least one memory access request. As with the results value above, bits are evaluated beginning with the least significant bit. When beginning to process the slice, slice encoder circuitry 524 receives, at 526, a current host index with a value of "0", indicating that the current host to be served is the first host represented in the slice. Slice encoder circuitry 524 determines, however, that the first host represented in the slice has not issue any memory access requests and moves to the next host that has issued at least one memory access request, i.e., the next host whose corresponding bit value is "1". In this example, where the bit values of the selected slice are "00110100", the next host with a corresponding bit value of "1" is the third host represented in the slice. Once a host that has issued at least one memory access request is identified, slice encoder circuitry 524 transmits to interface circuitry 512, at 528, a flag indicating a valid host, i.e., a host that has issued at least one memory access request. Slice encoder circuitry 524 also transmits to interface circuitry 512, at 530, the index of the identified host. In the above example, this index is two.

In response to receiving the valid host flag and the index of the host, interface circuitry 512 transmits, at 532, a ready flag and, at 534, index information for the request such that a non-volatile memory or other component to which the interface connects can act on, execute, or otherwise process the memory access request. Once completed, interface circuitry 512 receives, at 536, a request completion flag from the component that acted on the memory access request.

In response to receiving the completion flag, interface circuitry 512 increments the index value of the current host by one. This updated value becomes the current host index value transmitted, at 526, back to slice encoder circuitry 524. Slice encoder circuitry 524 again finds the next host that has issued at least one memory access request beginning with the host corresponding to the updated current host index value. In the above example, in which the bit values of the selected slice are "00110100", slice encoder circuitry 524 identifies the fifth host as the next host that has issued at least one memory access request. Slice encoder circuitry 524 again transmits, at 528 and 530, respectively, the flag indicating a valid host and the index value of the next host—in this example, an index value of four—to interface circuitry 512. This process continues until slice encoder circuitry 524 reaches the index corresponding to the last host represented in the slice. For example, for a 16-bit slice representing 16 host devices, slice encoder circuitry 524 continues until it reaches an index of 15.

Once slice encoder circuitry 524 reaches the last index, slice encoder circuitry 524 changes the value of the flag indicating a valid host to zero. In response to this change, interface circuitry 512 increments the index of the current slice to be processed by one. This updated index of the current slice to be processed is transmitted, at 510, to request multiplexer 508. Request multiplexer 508 identifies the next non-empty slice using the methods described above, or other suitable techniques, beginning from the slice corresponding to the updated index value. Once identified, the flag indicating a valid slice and the index of the next non-empty slice are again transmitted, at 514 and 516, respectively, to interface circuitry 512. This process continues until all slices have been processed.

When request multiplexer circuitry 508 reaches the index of the last slice in the master request, request multiplexer circuitry 508 changes the value of the flag indicating a valid slice to "0". The system then waits for a new master request to be received.

Figure 6:
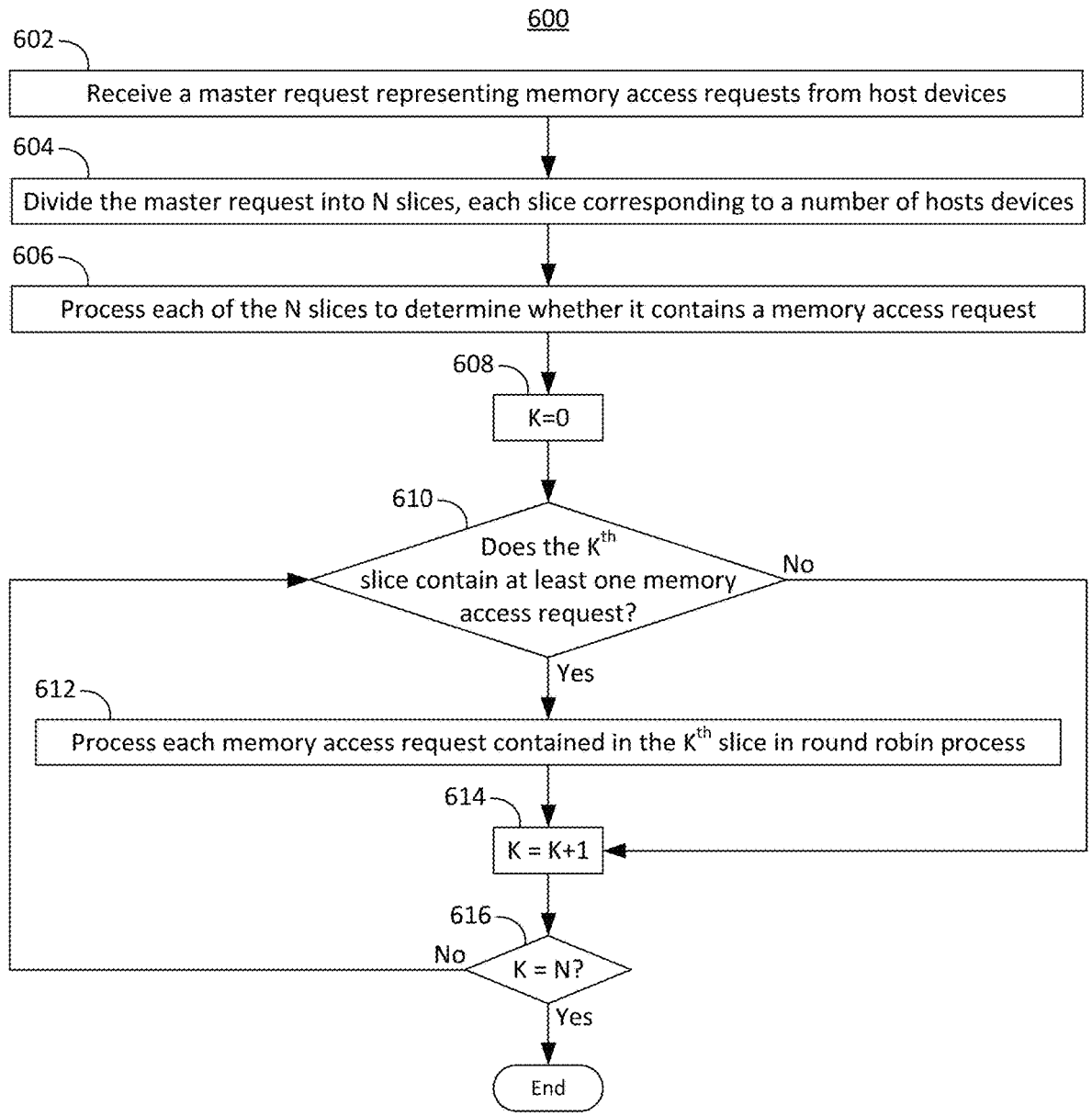
FIG. 6 is a flow diagram representing a process for performing nested round robin selection of memory access requests in accordance with some implementations of the subject matter of this disclosure.

FIG. 6 is a flow diagram representing a process for performing nested round robin selection of memory access requests in accordance with some implementations of the subject matter of this disclosure. Process 600 may be performed by, or implemented on, one or more circuitries described above in connection with FIG. 5. At 602, control circuitry 500 receives, at OR circuitry 504 and slice multiplexer circuitry 520, a master request representing memory access requests from a number of host devices. For example, the master request may represent memory access requests from 1024 host devices. At 604, control circuitry 500, using OR circuitry 504, divides the master request into N slices, each slice corresponding to the same number of hosts. Each slice thus contains the same number of bits, i.e., 16 bits. For example, a 1024-bit master request representing 1024 host devices is divided into 64 slices, each slice containing 16 bits. Each bit represents whether a particular host device has issued a memory access request.

At 606, control circuitry 500 processes each of the N slices to determine whether it contains a memory access request. Control circuitry 500 performs a bitwise OR operation comparing all bits of the slice. If any bit is a "1" then the result will be a "1", indicating that there is at least one memory access request issued by at least one host device represented in the slice.

At 608, control circuitry 500 initializes a counter variable K, setting its value to "0". At 610, control circuitry 500 performs a first round robin process, determining whether the $K^{th}$ slice contains at least one memory access request. Control circuitry 500 first evaluates the $K^{th}$ bit, counting from the least significant bit, of the results value to determine whether the $K^{th}$ slice contains a memory access request. If so ("Yes") at 610, then, at 612, control circuitry 500 processed the $K^{th}$ slice in a second round robin process in which each memory access request contained in the $K^{th}$ slice is served.

Once all memory access requests in the $K^{th}$ slice have been served, or if the $K^{th}$ slice does not contain any memory access request ("No" at 610), at 614, control circuitry 500 increments that value of K by one. At 616, control circuitry 500 determines whether K is equal to N, meaning that all N slices have been processed. If not ("No" at 616), there are additional slices to process and processing returns to 610. Otherwise ("Yes" at 616), the process ends. Control circuitry 500 then waits for a new master request to be received.

In some embodiments, if the $K^{th}$ slice does not contain a memory access request, control circuitry 500 retrieves a configurable value representing the number of slices to skip. Alternatively, the configurable value represents a minimum number of requests within a slice. Control circuitry 500 may receive, in addition to the master request, information regarding the number of memory access requests issued by each host device. Control circuitry 500 may then add the number of requests from each host device representing in the $K^{th}$ slice to determine whether the number of memory access requests meets or exceeds the configurable value. If not, control circuitry 500 may identify the next slice containing a number of memory access requests that meets or exceeds the configurable value. In this way, processing time and/or resources are not expended on a slice that contains very few memory access request. If no slice contains a number of memory access requests that meets or exceeds the configurable value, control circuitry 500 may lower the configurable value incrementally until at least one slice contains a number of memory access requests that meets or exceeds the configurable value.

Figure 7:
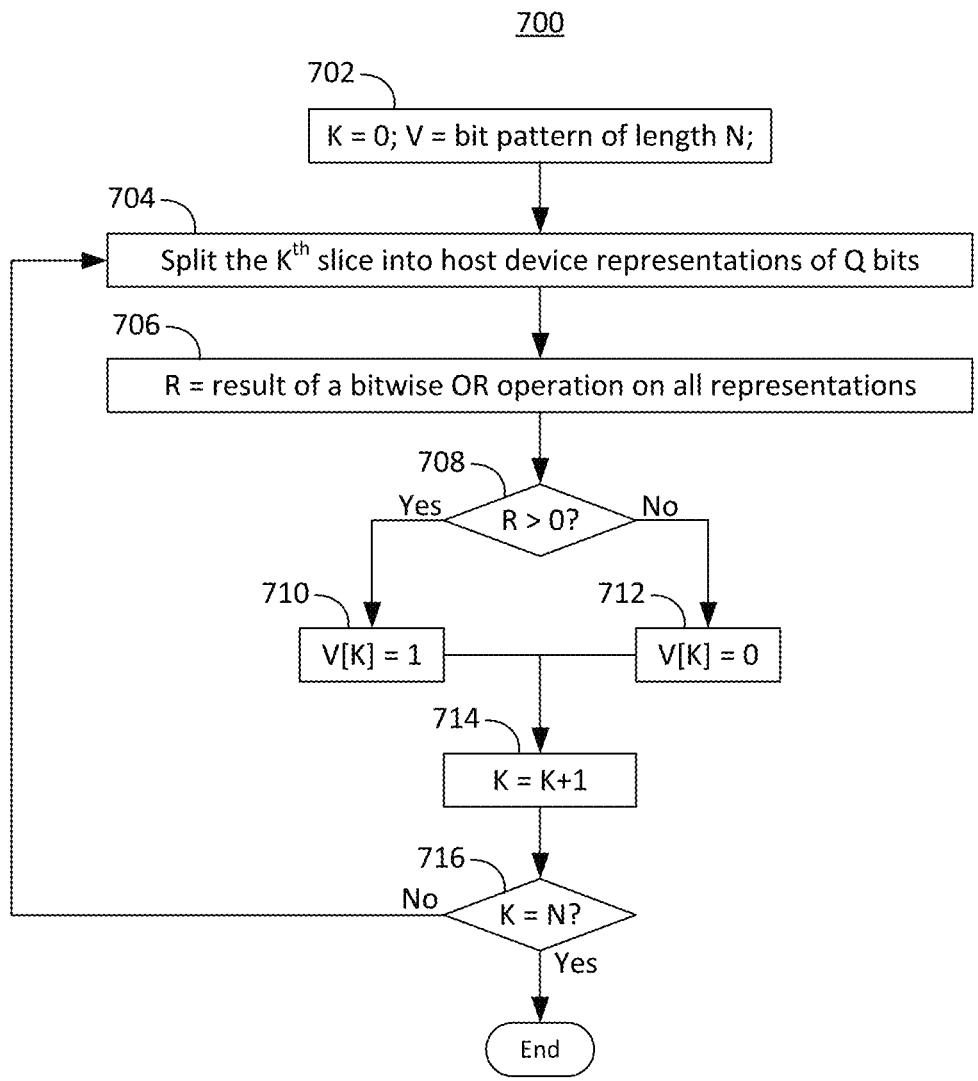
FIG. 7 is a flow diagram representing a process for performing a bitwise OR operation to determine whether slices of a master request contain memory access requests in accordance with some implementations of the subject matter of this disclosure.

FIG. 7 is a flow diagram representing a process 700 for performing a bitwise OR operation to determine whether slices of a master request contain memory access requests in accordance with some implementations of the subject matter of this disclosure. Process 700 may be performed by, or implemented on, one or more circuitries described above in connection with FIG. 5. At 702, control circuitry 500 initializes a counter variable K, setting its value to zero, and an array or other data structure V having a length equal to the number of slices. Each value within V may initially be set to "0" or may initially be a null or empty value. For example, for a master request representing 1024 host devices, V will have a length of 1024 bits, with each bit representing a single host device.

At 704, control circuitry 500, using OR circuitry 504, splits the $K^{th}$ slice into host device representations of Q bits, each representing a single host device. For example, a 16-bit slice may be split into sixteen 1-bit representations. In some implementations, if more than one bit is used to represent a single host device, a 16-bit slice may be split into two 8-bit representations, four 4-bit representations, or eight 2-bit representations, for example. At 706, control circuitry 500, using OR circuitry 504, performs a bitwise OR operation on all representations within the $K^{th}$ slice, and sets the value of a variable R to the result of the bitwise OR operation.

At 708, control circuitry 500 determines whether R is greater than zero, meaning that at least one host device represented in the $K^{th}$ slice has issued a memory access request. If R is greater than zero ("Yes" at 708), then, at 710, control circuitry 500 sets V[K], the value in V corresponding to the $K^{th}$ slice, to "1". Otherwise ("No" at 708), at 712, control circuitry 500 sets V[K] to "0".

At 714, control circuitry 500 increments the value of K by one. At 716, control circuitry 500 determines whether K is equal to N, meaning that all slices of the master request have been processed. If K is not equal to N ("No" at 716), then processing returns to 704 where the next slice is processed. If K is equal to N ("Yes" at 716), then the process is complete.

Figure 8:
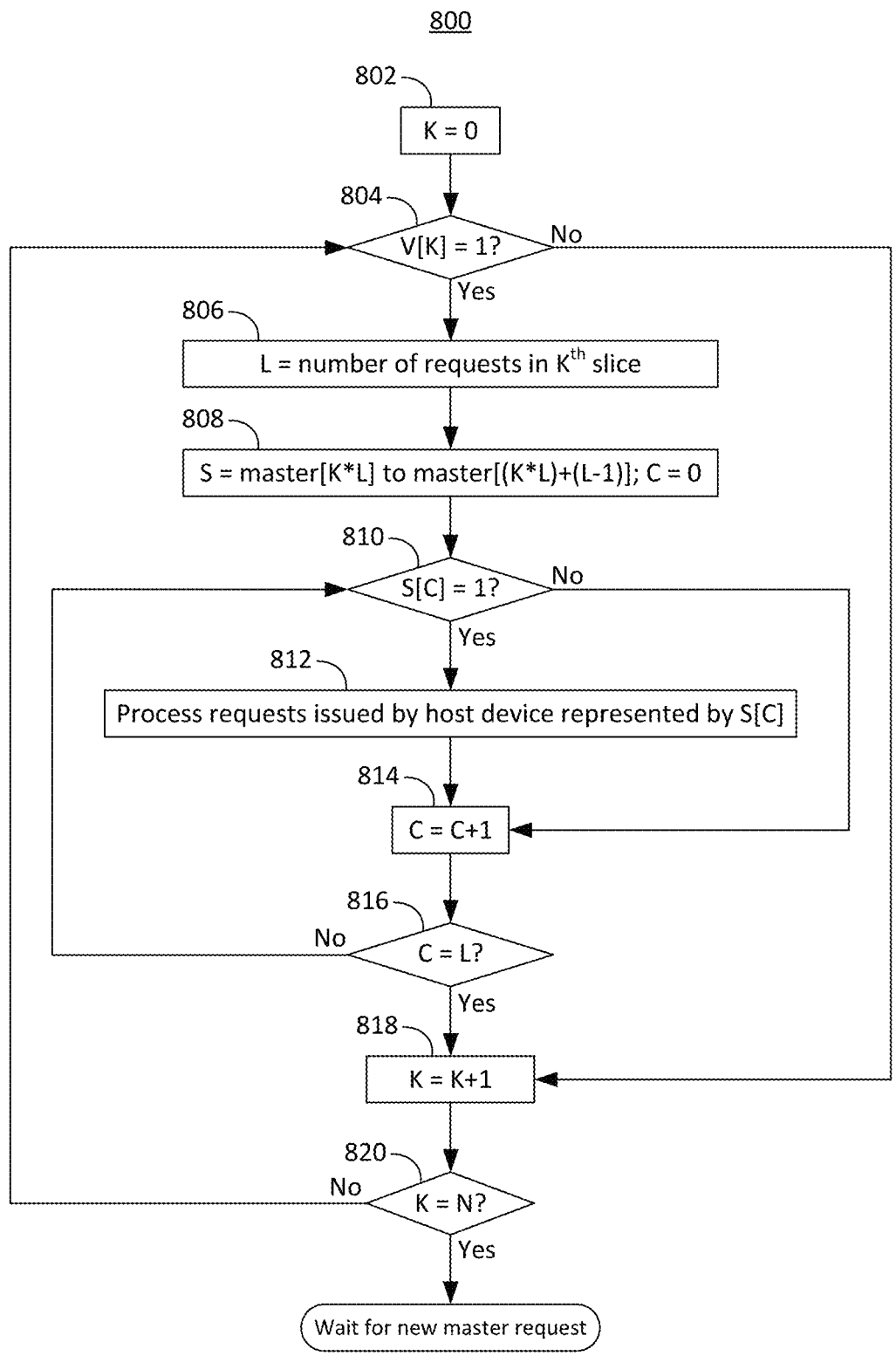
FIG. 8 is a flow diagram representing a process for serving memory access requests using a nested round robin process, in accordance with some implementations of the subject matter of this disclosure.

FIG. 8 is a flow diagram representing a process 800 for serving memory access requests using a nested round robin process, in accordance with some implementations of the subject matter of this disclosure. Process 800 may be performed by, or implemented on, one or more circuitries described above in connection with FIG. 5. At 802, control circuitry 500 initializes a counter variable K, setting its value to zero. In some implementations, this may be the same counter variable previously initialized as described above in connection with FIG. 6 or FIG. 7. In such implementations, control circuitry 500 may simply reset the value of K to zero.

At 804, control circuitry 500, using request multiplexer circuitry 508, begins a first round robin process, determining whether V[K], the value in V corresponding to the $K^{th}$ slice, is equal to one. If so, it means that there is at least one memory access request contained in the $K^{th}$ slice ("Yes" at 804), then, at 806, control circuitry 500 initializes a variable L representing the number of host devices represented in the $K^{th}$ slice. At 808, control circuitry 500 begins a second round robin process, extracting from the master request the set of bits representing the $K^{th}$ slice. This is accomplished by taking L bits from the master request beginning from an index value in the master request equal to the product of K and L. Thus, in the example, the starting bit is located at [K*L] and the ending bit is located at (K*L)+(L−1). For example, for a first slice, the value of K is zero. K*L, therefore, is also zero and (K*L)+(L−1) is fifteen. Thus, bits 0-15 are selected and extracted from the master request. For the second slice, the value of K is one. K*L is, therefore, 16 and (K*L)+(L−1) is 31. Thus, for the second slice, bits 16-31 are selected and extracted from the master request. The extracted bits are then stored in a variable S. Control circuitry 500 also initializes a counter variable C, setting its value to zero.

At 810, control circuitry 500 determines whether S[C] is equal to one, meaning that the host device representing by the $C^{th}$ bit in S issued a memory access request. If so ("Yes" at 810), then, at 812, control circuitry 500, using interface circuitry 512, processes the memory access requests issued by the host device $C^{th}$ represented by the $C^{th}$ bit in S.

After processing memory access requests issued by the host device represented by the $C^{th}$ bit in S, or if the host device represented by the $C^{th}$ bit in S has not issued any memory access requests ("No" at 810), at 814, control circuitry 500 increments the value of C by one. At 816, control circuitry 500 determines whether C is equal to L. If C is not equal to L, meaning there are additional host devices represented in the $K^{th}$ slice, then processing returns to 810.

If there are no memory access requests contained in the $K^{th}$ slice ("No" at 804), or if C is equal to L ("Yes" at 816) indicating the end of the second round robin process, then, at 818, control circuitry 500 increments the value of K by one. At 820, control circuitry 500 determines whether K is equal to N. If K is not equal to N ("No" at 820), meaning there are additional slices to process, then processing returns to 804. Otherwise ("Yes" at 820), the second round robin process is complete. Control circuitry 500 then waits for a new master request to be received.

Various implementations discussed in conjunction with FIGS. 1-8 may be performed by various electronic components of one or more electronic circuits, such as but not limited to an integrated circuit, application-specific integrated circuit (ASIC), and/or the like These implementations may also be performed by one or more firmware of software components. Various components discussed throughout this disclosure are configured to include a set of electronic circuit components, and communicatively operate on one or more electronic circuits. Each electronic circuit is configured to include any of, but not limited to logic gates, memory cells, and/or the like. Various implementations and components disclosed herein are configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the subject matter of this disclosure. It is noted that various alternatives to the implementations of the subject matter of this disclosure described herein may be employed in practicing the subject matter of this disclosure. It is intended that the following claims define the scope of the subject matter of this disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations must be performed to achieve the desirable results.

The subject matter of this disclosure has been described in terms of particular aspects, but other aspects can be implemented and are within the scope of the following claims. For example, the actions recited in the claims can be performed in a different order and still achieve desirable results. As one example, the process depicted in FIG. 5 does not necessarily require the particular order shown, or sequential order, to achieve desirable results. In certain implementations, multitasking and parallel processing may be advantageous. Other variations are within the scope of the following claims.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. An apparatus for managing memory access requests from a plurality of host devices, the apparatus comprising:
   input circuitry configured to receive a master request comprising a plurality of bits, each bit representing whether a host device of the plurality of host device has issued a memory access request; and
   control circuitry configured to:
      divide the master request into a plurality of slices, each respective slice containing a subset of the plurality of bits corresponding to a subset of host devices of the plurality of host devices;
      determine, based on the respective subsets of the plurality of bits, whether each respective slice contains at least one memory access request; and
      in a first round robin process, for each respective slice:
         determine whether the respective slice contains a memory access request;
         in response to determining that the respective slice contains at least one memory access request, process the at least one memory access request contained in the respective slice via a second round robin process before proceeding to process memory access requests of another slice; and
         in response to determining that the respective slice does not contain a memory access request, skip to a next slice without processing the respective slice.

2. The apparatus of claim 1, wherein the control circuitry is further configured to:
   generate an indication, for each respective slice, indicating whether the respective slice contains a memory access request,
   wherein the control circuitry configured to determine whether the respective slice contains a memory access request is further configured to do so based on the indication for the respective slice.

3. The apparatus of claim 2, wherein the control circuitry configured to generate an indication is further configured to perform a bitwise OR operation to identify whether the respective slice contains a memory access request.

4. The apparatus of claim 3, wherein:
- each slice of the plurality of slices contains the same number of bits representing a number of host devices, and
- the control circuitry configured to perform a bitwise OR operation is further configured to compare a bit pattern of all host devices represented by the respective slice.

5. The apparatus of claim 1, wherein the control circuitry configured to skip to a next slice is further configured to:
- identify, based on an indication in a current slice, a subsequent slice containing at least one memory access request, wherein each slice of the plurality of slices is normally processed sequentially in the first round robin process; and
- access the identified slice without accessing any intervening slices such that the first round robin process moves directly from the current slice to the identified slice.

6. The apparatus of claim 5, wherein the control circuitry is configured to identify, based on an indication in a current slice, a subsequent slice containing at least one memory access request, is further configured to:
- retrieve a configurable value; and
- identify the subsequent slice based further on the configurable value.

7. The apparatus of claim 1, wherein the control circuitry configured to skip to a next slice without processing the respective slice is further configured to do so within a single clock cycle such that no clock cycle is spent processing the respective slice that does not contain a memory access request.

8. A method for managing memory access requests from a plurality of host devices, the method comprising:
- receiving a master request comprising a plurality of bits, each bit representing whether a host device of the plurality of host devices has issued a memory access request;
- dividing the master request into a plurality of slices, each respective slice containing a subset of the plurality of bits corresponding to a subset of host devices of the plurality of host devices;
- determining, based on the respective subsets of the plurality of bits, whether each respective slice contains at least one memory access request; and
- in a first round robin process, for each respective slice:
  - determining whether the respective slice contains a memory access request;
  - in response to determining that the respective slice contains at least one memory access request, processing the at least one memory access request contained in the respective slice via a second round robin process before proceeding to process memory access requests of another slice; and
  - in response to determining that the respective slice does not contain a memory access request, skipping to a next slice without processing the respective slice.

9. The method of claim 8, further comprising:
- generating an indication, for each respective slice, indicating whether the respective slice contains a memory access request,
- wherein determining whether the respective slice contains a memory access request is based on the indication for the respective slice.

10. The method of claim 9, wherein generating an indication further comprises performing a bitwise OR operation to identify whether the respective slice contains a memory access request.

11. The method of claim 10, wherein:
- each slice of the plurality of slices contains the same number of bits representing a number of host devices, and
- performing a bitwise OR operation further comprises comparing a bit pattern of all host devices represented by the respective slice.

12. The method of claim 8, wherein skipping to a next slice further comprises:
- identifying, based on an indication in a current slice, a subsequent slice containing at least one memory access request, wherein each slice of the plurality of slices is normally processed sequentially in the first round robin process; and
- accessing the identified slice without accessing any intervening slices such that the first round robin process moves directly from the current slice to the identified slice.

13. The method of claim 12, wherein identifying, based on an indication in a current slice, a subsequent slice contain at least one memory access request further comprises:
- retrieving a configurable value; and
- identifying the subsequent slice based further on the configurable value.

14. The method of claim 8, wherein skipping to a next slice without processing the respective slice occurs within a single clock cycle such that no clock cycle is spent processing the respective slice that does not contain a memory access request.

\* \* \* \* \*